United States Patent [19]

Eidelman

[11] Patent Number: 4,741,154

[45] Date of Patent: May 3, 1988

[54] ROTARY DETONATION ENGINE

[75] Inventor: Shmuel Eidelman, Rockville, Md.

[73] Assignee: The United States of America as represented by the Secretary of the Navy

[21] Appl. No.: 362,377

[22] Filed: Mar. 26, 1982

[51] Int. Cl.$^4$ ............................. F02C 3/14; F02C 5/02
[52] U.S. Cl. .................................... 60/39.34; 415/80
[58] Field of Search .............. 60/39.34, 39.35, 39.76, 60/39.19, 39.5, 242; 415/80, 81, 82

[56] References Cited

U.S. PATENT DOCUMENTS

| | | | |
|---|---|---|---|
| 523,734 | 7/1894 | Shaw. | |
| 684,743 | 10/1901 | Burger | 60/39.34 |
| 1,260,015 | 3/1918 | Noakes | 60/39.34 |
| 1,287,049 | 12/1918 | Kramer | 60/39.34 |
| 1,291,273 | 1/1919 | Tyler | 60/39.34 |
| 2,599,209 | 6/1952 | Tenney et al. | 60/39.34 |
| 2,660,858 | 12/1953 | Lichty | 60/39.19 |
| 2,690,809 | 10/1954 | Kerry | 170/135.4 |
| 3,008,293 | 11/1961 | Servanty | 60/39.34 |
| 3,026,088 | 3/1962 | Green | 415/80 |
| 3,089,307 | 5/1963 | Kollander | 60/39.34 |
| 3,177,660 | 4/1965 | Haller | 60/39.34 |
| 3,224,711 | 12/1965 | Warren et al. | 60/39.34 |
| 3,747,344 | 7/1973 | Porter et al. | 60/242 |
| 3,804,549 | 4/1974 | Kellenbarger | 415/80 |
| 3,899,923 | 8/1975 | Teller | 60/39.5 |

FOREIGN PATENT DOCUMENTS 2805300  8/1979  Fed. Rep. of Germany ........ 415/80
430465  10/1911  France ........................... 60/39.34

OTHER PUBLICATIONS

Nicholls et al., "Intermittent Detonation as a Thrust-Producing Mechanism", *Jet Propulsion*, May 1957.

Primary Examiner—Louis J. Casaregola
Assistant Examiner—Donald E. Stout
Attorney, Agent, or Firm—C. D. B. Curry; W. C. Daubenspeck

[57] ABSTRACT

In an engine of the type wherein the combustion of fuel is initiated by a detonation wave, a plurality of axisymmetrical rotor elements are fixed along the length of a drive shaft. The drive shaft has a central longitudinal chamber which is supplied with the fuel mixture. Each rotor element has an annular initiation chamber which communicates with the central chamber of the shaft and a system of ducts which extend outward from the initiation chamber to exhaust openings. The initiation chambers and the associated systems of ducts are selectively filled with the fuel mixture and detonation is selectively initiated in the initiation chambers. This detonation produces detonation waves which propagate outward in the ducts resulting in the combustion products being ejected from the ducts in the form of high speed jets to produce rotational moment on the rotor/shaft unit. The speed of the exhaust jets may be modified to tailor the jet speed to the speed of rotation by varying the divergence of nozzles at the ends of the ducts or by injecting a secondary fluid into the exhaust jet.

32 Claims, 3 Drawing Sheets

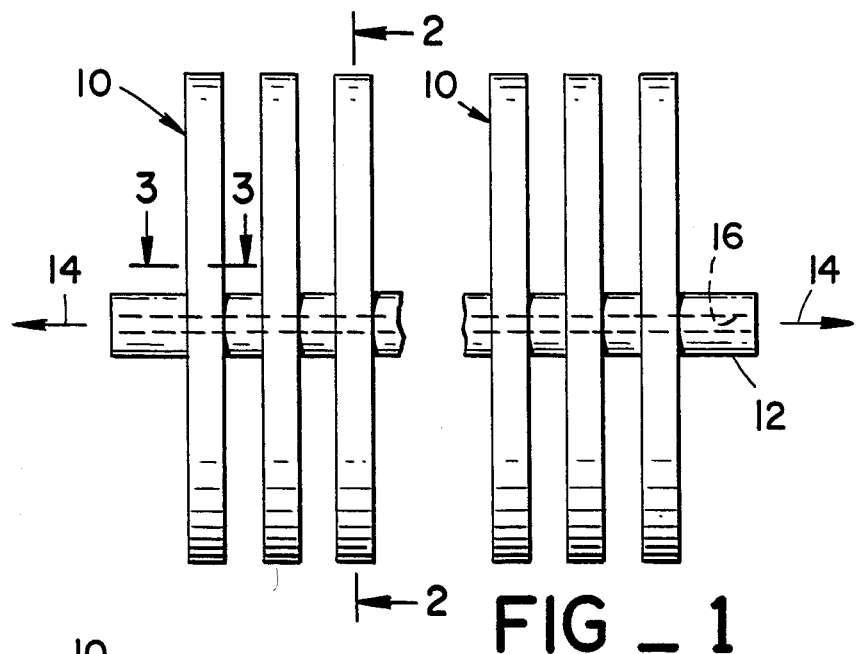
FIG_1
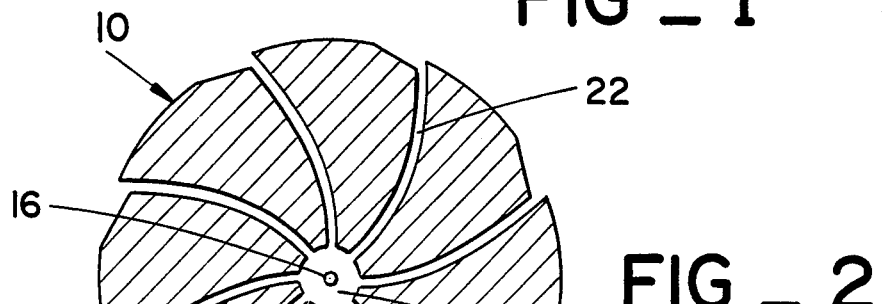
FIG_2
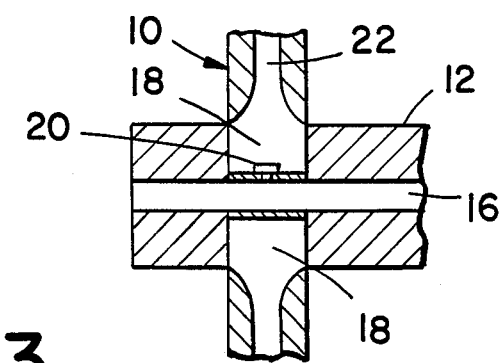
FIG_3

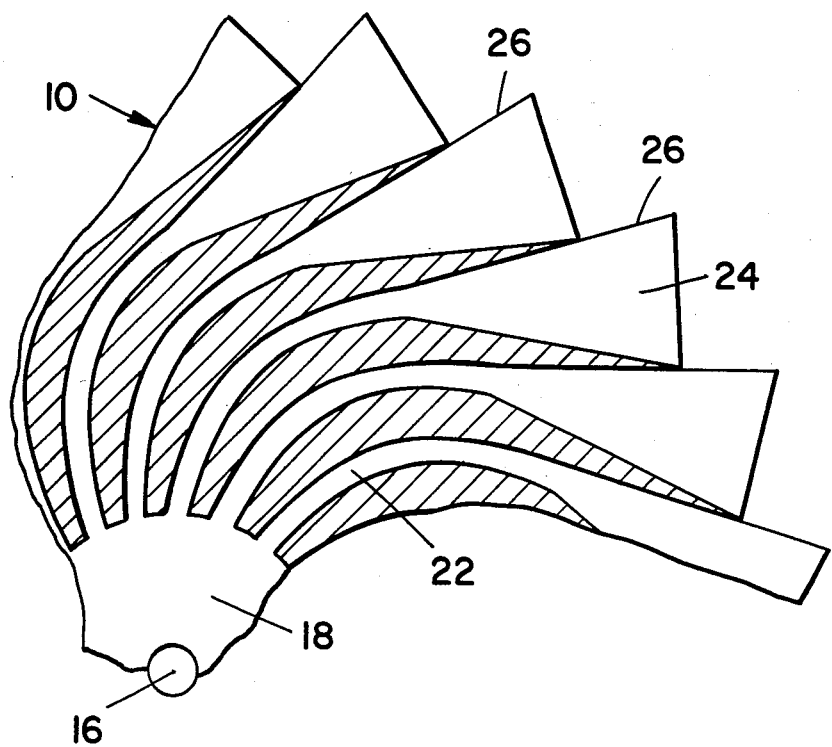
FIG _ 4
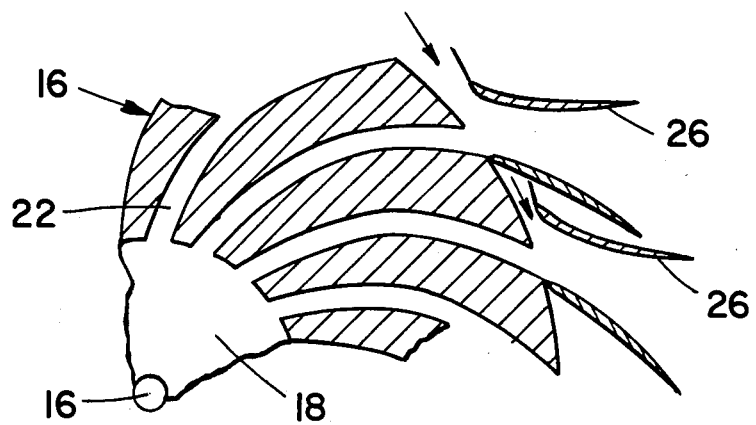
FIG _ 5

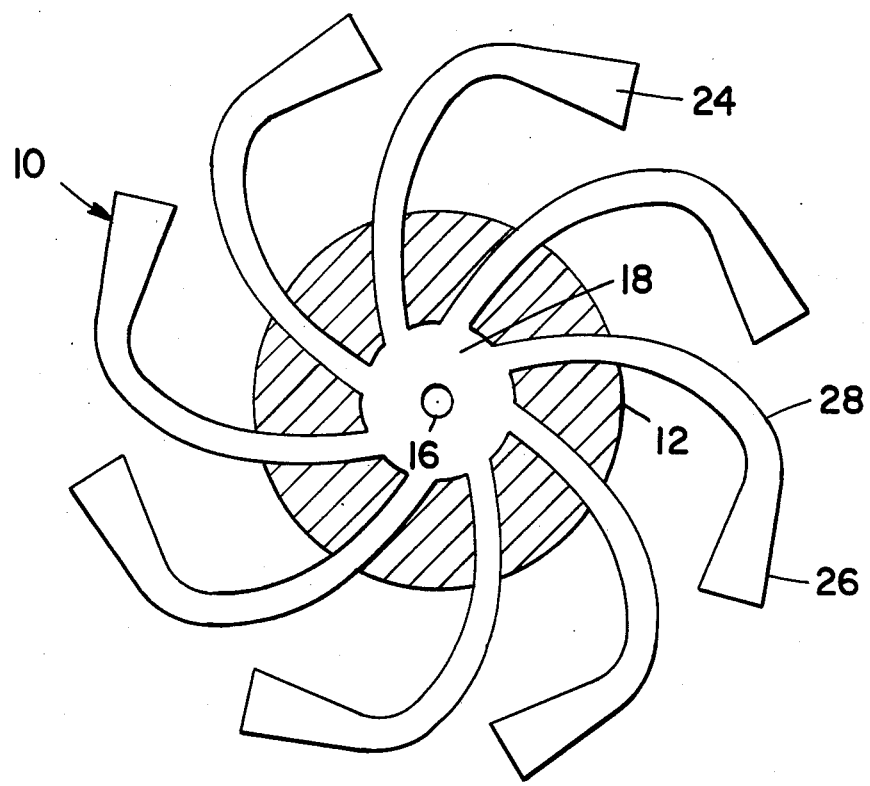
FIG _ 6
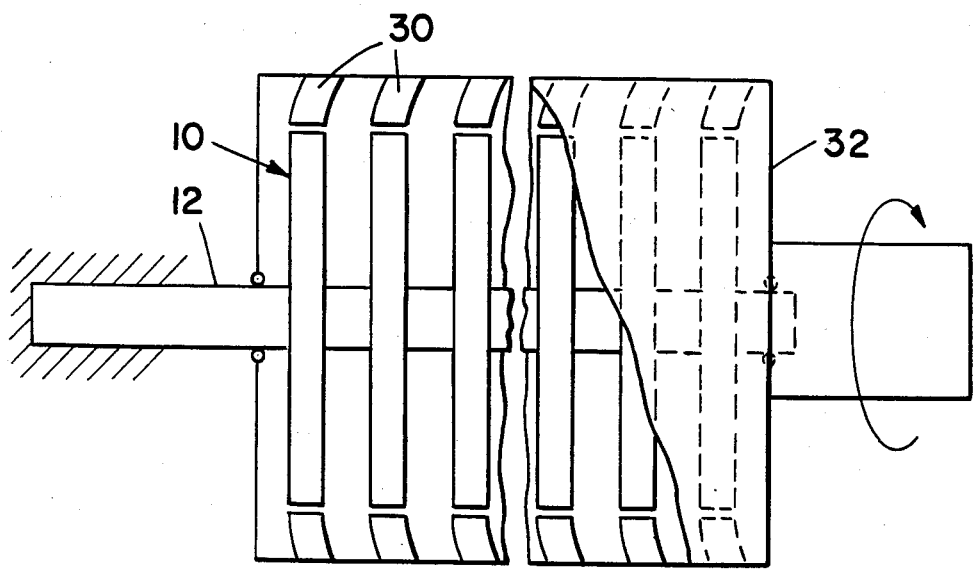
FIG _ 7

ROTARY DETONATION ENGINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates in general to engines and, in particular, to a rotary engine using detonation waves to initiate fast combustion of a fuel mixture.

2. Description of Prior Art

The reciprocating internal combustion engine which is widely used to transform chemical energy of the fuel into mechanical energy has very low fuel efficiency, usually less than 20 percent of the chemical energy is transformed into mechanical energy. Complex mechanical apparatus is required to transform the reciprocating motion of the piston into the rotary motion of the drive shaft. The sliding friction of the piston in the combustion chamber significantly limits the allowable temperature and pressure in the combustion chamber and thus limits the thermal efficiency of the engine. The combustion of the fuel occurs at ordinary rates. These ordinary rates of combustion result in prolonged heating of the combustion chamber which produces more degradation of the chamber walls per unit volume of fuel burned than when the fuel is burned at a faster rate. This in turn limits the power-to-weight ratio of the engine.

Rotary engines reduce the mechanical complexity by eliminating the need to transform the reciprocating piston motion to rotary motion of the drive shaft. For example, U.S. Pat. Nos. 3,089,307 and 3,804,549 disclose rotory engines in which the rotor has a plurality of circumferentially spaced combustion chambers formed with ducts to exhaust combustion products to provide reaction forces. However, the conventional rotary engines do not provide substantially improved efficiency or power-to-weight ratio over the reciprocating engines because the combustion of fuel occurs at ordinary rates.

The use of intermittent detonation as a thrust producing mechanism has been suggested. See, for example, "Intermittent Detonation as a Thrust Producing Mechanism", J. A. Nicholls et al, Jet Propulsion, May, 1957 and United Kingdon Pat. No. 1,269,123. Both of these references envision detonation apparatus in which the detonation occurs in a plurality of elongated tubular combustion chambers which extend parallel to each other. Complex apparatus is required to transform the linear thrust provided by these devices to the rotary motion required for most applications. This linear combustion chamber arrangement has a problem in providing a smooth continuous output power. A smooth output requires that new fuel mixture be introduced into the combustion chamber at a rate comparable to the very high rate of burn in detonative combustion. Excessive energy is required to introduce the new mixture at the appropriate rate thus reducing the efficiency of the device. Furthermore, the high duty cycle required results in over exposure of the tubular chamber to the combustion process and also a limitation on the speed of the detonation wave because of excessive heat buildup.

SUMMARY OF THE INVENTION

It is an object of the present invention to provide an engine combining the advantages of the rotary engine with the advantages of fast detonative combustion.

Another object of the present invention is to provide an engine in which the temperature and pressure of the combustion process could be increased significantly above the values of those parameters encountered in the internal combustion engine.

A futher object of the present invention is to provide a rotary engine having an improved power-to-weight ratio.

Another object of the present invention is to provide a detonation engine having the reduced complexity of a rotary engine.

A further object of the present invention is to provide a detonation engine which provides a smooth quasi-continuous power output.

Another object of the present invention is to provide a dentonation engine in which the fuel may be introduced into the combustion chamber at a relatively slow rate.

Still another object of the present invention is to provide a rotary detonation engine which operates efficiently at various speeds of rotation.

These and other objects are provided by a rotary engine using fast detonative combustion of a fuel-oxidizer mixture. A plurality of axisymmetrical rotor elements are fixed along the length of a drive shaft having a central longitudinal chamber which is supplied with the fuel mixture. Each rotor element has an annular initiation chamber which communicates with the central chamber of the shaft and a system of ducts which extends outward from the initiation chamber to exhaust openings. The initiation chambers and the associated systems of ducts are selectively filled with the fuel mixture and detonation is initiated in the initiation chamber. This detonation produces detonation waves which propagate outward in the ducts resulting in the combustion products being ejected from the ducts in the form of high speed jets to produce rotational moment on the rotor/shaft unit.

Other advantages and features will become apparent from the following detailed description and the accompanying drawings wherein:

BRIEF DESCRIPTION OF THE DRAWINGS

FIG. 1 is a schematic elevation view of an embodiment of a rotary detonation engine according to the present invention;

FIG. 2 is a cross-sectional view of the embodiment of FIG. 1 taken along lines 2—2 in FIG. 1;

FIG. 3 is a cross-sectional view of the embodiment of FIG. 1 taken along lines 3—3 in FIG. 1;

FIG. 4 is a partial cross-sectional view of a rotor element illustrating a diverging nozzle for reducing the speed of the exhaust jets;

FIG. 5 is a partial cross-sectional view illustrating the use of a variable geometry ejector nozzle to control the speed of the exhaust jet;

FIG. 6 is a cross-sectional schematic view of an alternative structure for use as the axisymmetrical element in FIG. 1; and FIG. 7 is a schematic view illustrating an embodiment of the present invention wherein the detonation combustion occurs in a stator element and exhaust jets are directed onto a surrounding rotor element.

DESCRIPTION OF THE PREFERRED EMBODIMENT

Referring now to the drawing and, in particular to FIGS. 1-3, an embodiment illustrating the basic principles of the rotary detonation engine according to the present invention includes a plurality of rotor elements 10 fixed on a shaft 12 to form an integral unit. The rotor elements 10 such as the disc-like elements illustrated are typically disposed uniformly along the length of the shaft 12 and are symmetrical with respect to the longitudinal axis 14. The shaft has a central longitudinal chamber 16 which is supplied with a detonatable fuel mixture.

Each rotor element 10 has an annular chamber 18 which communicates with the central longitudinal chamber 16 in the shaft 12 through a suitable valve 20. Each rotor element has a plurality of symmetrically spaced ducts or channels 22 which extend outward from the annular chamber 18 to exhaust openings 24 on the periphery of the rotor element 10. The ducts 22 are of a cross-sectional area which permits propagation of detonation waves and are oriented and shaped so that effluents therefrom are directed tangentially to the rotor element to produce a rotational moment on the rotor/shaft unit.

In the operation of the basic rotary detonation engine, a detonatable mixture is continuously supplied to the longitudinal chamber 16. This longitudinal chamber 16 functions as a port to deliver the fuel mixture to the initiation chambers 18 and the ducts 22 through the valves 20. The valves 20 are controlled so that the fuel mixture is fed to a selected rotor element or combination of rotor elements. When the initiation chambers 18 and the associated system of ducts 22 for the selected rotor elements are filled to the desired extent (either completely or partially filled) with the combustible mixture, the valve 20 is closed and detonation of the fuel mixture is initiated in the annular chamber by suitable means (not shown). There are many techniques which are applicable for initiating the detonation in the initiation chamber of the selected rotor. For example, conventional electric spark apparatus may be used to initiate the detonation process. Other possibilities include the introduction of a hot gas jet into the initiation chamber or the use of lasers to initiate and support the detonation process. The use of an electronic control means for controlling the valve apparatus used in the introduction of the fuel mixture to the initiation chamber 18 and for controlling the detonation initiation apparatus is preferred.

The ignition in the initiation chamber 18 produces detonation waves which propagate outward in the ducts 22 of the rotor 10. The leading shock wave of the detonation wave is followed immediately by a reaction zone which results in the fast combustion of the fuel mixture in the ducts. The detonation wave results in combustion of the fuel mixture that is two orders of magnitude faster than ordinary combustion such as that of the internal combustion engine. The pressure in the ducts 22 behind the detonation wave front is one or two orders of magnitude higher than the initial pressure.

The fast combustion of the fuel mixture at high pressures by the detonation engine provides several advantages over non-detonation engines. The fast detonative combustion results in less heating of the duct walls per unit of fuel than does the longer burning time of alternative engines because the combustion process occurs much more quickly. Thus for a channel having a given heat resistance, the detonation engine can consume more fuel per unit time without damaging the channel. Because the detonation combustion can burn more fuel per unit time than regular combustion, the detonation engine has the capacity to generate more power per unit engine weight. In addition, the increased pressure at combustion results in a thermodynamically more efficient combustion.

Because of the high pressure in ducts 22 behind the detonation wave, the combustion products are ejected from the ducts in the form of high speed jets. The rotary detonation engine will operate most efficiently when the speed of the output jets is the same as the speed of rotation of the rotor/shaft body. The speed of the output jet for a specific channel structure is fixed due to the characteristics inherent in detonation. For each fuel mixture there is only a limited temperature and pressure range which can be produced by the detonative combustion. Thus the speed of the jet is determined by the fuel mixture and the structure of the exhaust ducts 22. The speed of a jet in a channel of a uniform cross-section is fixed because the channel must be compatible with the propagation of a detonation wave. However, the speed may be reduced at the output of the channel by providing a diverging channel or a channel having a diverging nozzle 26 at the end as illustrated in FIG. 4. The diverging nozzle 26 will reduce the speed of the output jet and provide improved performance at a slower speeds of rotation if the nozzle divergence is selected to provide an output jet speed corresponding to the desired speed of rotation.

The output speed of the jet as the nozzle may also be modified by the introduction of a secondary fluid at the diverging nozzle. As illustrated in FIG. 5 a secondary fluid such as air or water is injected into the diverging end of the channel to slow the speed of the output jet.

In order to operate efficiently at variable speeds of rotation, for example, operation at a slow speed during initial startup and at a higher speed during normal operation, a nozzle having an adjustable divergence may be provided. Initially the nozzle would be more opened for the slower speeds and, as the speed of rotation increases, the cross-section of the nozzle would be narrowed to match the output jet speed with the speed of rotation. Alternatively in the case of an output nozzle operating in conjunction with an injector of secondary fluid, the amount of secondary fluid injected can be controlled to match the speed of the jet with the speed of rotation. For example, the secondary fluid intake may be completely opened at start up allowing maximum injection of the secondary fluid and gradually be reduced until it is fully closed at the maximum speed of rotation.

A rotor/shaft unit having a large number of rotor elements 10 is within the scope of the present detonation engine. The number of rotor elements 10 may be increased without a significant increase in the cost or the complexity of the engine and this capability has several advantages. A large number of rotor elements will lead to smoother operation of the engine because the detonation process may be initiated alternately in separate rotor elements or groups of rotor elements to create a constant rotational moment on the shaft 12. Because the speed of detonative combustion is two orders of magnitude larger than the speed of deflagrative combustion in ordinary engines, only a small percentage of the chambers must be used to burn the amount of fuel that would be consumed in all the chambers at ordinary rates. For example if only ten percent of the chambers must be initiated at one time, there is more time between firings of each rotor element and thus more time to introduce fuel into the rotor elements. Therefore the fuel can be introduced at rates much slower than the rate of combustion, thus eliminating the need for introduction of the fuel mixture at high velocities which was a disadvantage in the linear detonation engine design. The low duty cycle for each individual rotor element reduces exposure of the element to the combustion process and thus reduces wear and provides more reliable operation.

It should be obvious that many axisymmetrical structures are suitable for use as rotor elements. For example, instead of the continuous body shown in FIG. 1-3, the rotor element 10 could be formed by a system of separated tubes 28 extending outward from the detonation chamber as shown in FIG. 6. It should also be apparent that within the scope of the basic apparatus disclosed herein, the rotor/shaft unit of FIGS. 1-3 could be used as a stator. In this case, illustrated in FIG. 7, the jets from the ducts would be directed onto the blades 30 of a suitably designed rotating turbine 32 which would surround the stationary detonation engine (rotor/shaft) and generate the required rotational moment.

Obviously many modifications and variations of the present invention are possible in the light of the above teachings. It is therefore to be understood that within the scope of the appended claims the invention may be practiced otherwise than as specifically described.

What is claimed is:

1. In an engine of the type wherein the combustion of the fuel mixture is carried out by a detonation wave, the improvement comprising:
   (a) an elongated shaft having a central longitudinal chamber, said chamber being supplied with a detonatable fuel mixture;
   (b) a plurality of axisymmetrical elements integral with said shaft and disposed along the length thereof, each said axisymmetrical element having a central annular initiation chamber and a plurality of ducts extending outward from said initiation chamber to exhaust openings on the periphery of the axisymmetrical element, said ducts having a cross-sectional area which permits propagation of detonation waves;
   (c) means for selectively introducing said detonatable mixture from said central chamber into the initiation chamber of each said axisymmetrical element and the ducts of said axisymmetrical element; and
   (d) means for selectively initiating detonation of said fuel mixture in the initiation chamber of each said axisymmetrical element, whereby ignition and detonation of fuel mixture in said initiation chamber will produce a detonation wave which travels outward from such initiation chamber in said ducts to initiate fast combustion of the fuel mixture in said ducts, the combustion products being exhausted from said exhaust openings in the form of high speed jets oriented to produce a rotational moment in said element and said shaft.

2. In an engine of the type wherein the combustion of the fuel mixture is carried out by a detonation wave, the improvement comprising:
   (a) an elongated drive shaft having a central longitudinal chamber, said chamber being supplied with a detonable fuel mixture;
   (b) a plurality of rotor elements integral with said shaft and disposed along the length thereof, each said rotor element having a central annular initiation chamber and a plurality of ducts extending outward from said initiation chamber to exhaust openings on the periphery of the rotor element, said ducts having a cross-sectional area which permits propagation of detonation waves;
   (c) means for selectively introducing said detonatable mixture from said central chamber into the initiation chamber of each said rotor element and the ducts of said rotor element; and
   (d) means for selectively initiating detonation of said fuel mixture in the initiation chamber of each said rotor element, whereby ignition and detonation of said fuel mixture in said initiation chamber will produce detonation waves which travel outward from said initiation chamber in said ducts to initiate fast combustion of the fuel mixture in said ducts, the combustion products being exhausted from said exhaust openings in the form of high speed jets oriented to produce a rotational amount in said rotor element and said drive shaft.

3. Apparatus as recited in claim 1 wherein said shaft and said axisymmetrical elements are non-rotatable and further including a rotor element for receiving said combustion products from said high speed jets, said high speed jets producing a rotational moment on said rotor.

4. Apparatus as recited in claim 2 wherein said rotor elements are disks.

5. Apparatus as recited in claim 1 wherein said axisymmetrical elements are disks.

6. Apparatus as recited in claim 3 wherein said axisymmetrical elements are disks.

7. Apparatus as recited in claim 1 wherein the exhaust openings diverge to form a nozzle at the end of said ducts.

8. Apparatus as recited in claim 2 wherein the exhaust openings diverge to form a nozzle at the end of said ducts.

9. Apparatus as recited in claim 3 wherein the exhaust opening diverge to form a nozzle at the end of said ducts.

10. Apparatus as recited in claim 4 wherein the exhaust openings diverge to form a nozzle at the end of said ducts.

11. Apparatus as recited in claim 7 wherein said nozzles are adjustable to modify the speed of said exhaust jets.

12. Apparatus as recited in claim 8 wherein said nozzles are adjustable to modify the speed of said exhaust jets.

13. Apparatus as recited in claim 9 wherein said nozzles are adjustable to modify the speed of said exhaust jets.

14. Apparatus as recited in claim 10 wherein said nozzles are adjustable to modify the speed of said exhaust jets.

15. Apparatus as recited in claim 7 further including:
   (a) means for injecting a secondary fluid into said nozzle to modify the speed of said exhaust jet.

16. Apparatus as recited in claim 8 further including:
   (a) means for injecting a secondary fluid into said nozzle to modify the speed of said exhaust jet.

17. Apparatus as recited in claim 9 further including:
   (a) means for injecting a secondary fluid into said nozzle to modify the speed of said exhaust jet.

18. Apparatus as recited in claim 10 further including:
(a) means for injecting a secondary fluid into said nozzle to modify the speed of said exhaust jet.

19. Apparatus as recited in claim 7 further comprising:
(a) means for injecting a variable amount of a secondary fluid into said nozzle to adjust the speed of the exhaust jets.

20. Apparatus as recited in claim 8 further comprising:
(a) means for injecting a variable amount of a secondary fluid into said nozzle to adjust the speed of the exhaust jets.

21. Apparatus as recited in claim 9 further comprising:
(a) means for injecting a variable amount of a secondary fluid into said nozzle to adjust the speed of the exhaust jets.

22. Apparatus as recited in claim 10 further comprising:
(a) means for injecting a variable amount of a secondary fluid into said nozzle to adjust the speed of the exhaust jets.

23. Apparatus as recited in claim 19 wherein said secondary fluid is air.

24. Apparatus as recited in claim 20 wherein said secondary fluid is air.

25. Apparatus as recited in claim 21 wherein said secondary fluid is air.

26. Apparatus as recited in claim 22 wherein said secondary fluid is air.

27. Apparatus as recited in claim 19 wherein said secondary fluid is water.

28. Apparatus as recited in claim 20 wherein said secondary fluid is water.

29. Apparatus as recited in claim 21 wherein said secondary fluid is water.

30. Apparatus as recited in claim 22 wherein said secondary fluid is water.

31. Apparatus as recited in claim 1 wherein said plurality of ducts extending outward from said initiation chamber extend outward from the periphery of said initiation chamber.

32. Apparatus as recited in claim 2 wherein said plurality of ducts extending outward from said initiation chamber extend outward from the periphery of said initiation chamber.

* * * * *